US012183198B2

(12) United States Patent
Sagara et al.

(10) Patent No.: US 12,183,198 B2
(45) Date of Patent: *Dec. 31, 2024

(54) CONTROL DEVICE, CONTROL METHOD, AND COMPUTER-READABLE RECORDING MEDIUM

(71) Applicant: HONDA MOTOR CO., LTD., Tokyo (JP)

(72) Inventors: Masafumi Sagara, Tokyo (JP); Tatsuro Fujiwara, Tokyo (JP); Mizuki Owada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 47 days.

This patent is subject to a terminal disclaimer.

(21) Appl. No.: 18/121,871

(22) Filed: Mar. 15, 2023

(65) Prior Publication Data

US 2023/0316916 A1 Oct. 5, 2023

(30) Foreign Application Priority Data

Mar. 30, 2022 (JP) ................................ 2022-056579

(51) Int. Cl.
*G08G 1/14* (2006.01)
*B60W 30/06* (2006.01)
(Continued)

(52) U.S. Cl.
CPC ............ *G08G 1/143* (2013.01); *B60W 30/06* (2013.01); *B60W 50/14* (2013.01);
(Continued)

(58) Field of Classification Search
CPC ..... G08G 1/143; G06V 20/586; B60W 30/06; B60W 50/14; B60W 2050/146; B60W 2420/403
See application file for complete search history.

(56) References Cited

U.S. PATENT DOCUMENTS 8,665,118 B1 * 3/2014 Woodard ............... G08G 1/148
705/13
8,791,838 B2 * 7/2014 Scofield ........... G08G 1/096838
705/28
(Continued)

FOREIGN PATENT DOCUMENTS

JP 2021-000958 A 1/2021
JP 2021-000972 A 1/2021

*Primary Examiner* — Chico A Foxx
(74) *Attorney, Agent, or Firm* — Paratus Law Group, PLLC

(57) ABSTRACT

A control device includes circuitry configured to: detect a first parking candidate position based on external environment recognition data of a moving body and a second parking candidate position registered in advance by a user of the moving body; cause a display device to display detected parking candidate positions; receive, from a user of the moving body, selection of a target parking position from among the displayed parking candidate positions; and park the moving body at the selected target parking position. The circuitry causes to display the second parking candidate position preferentially over the first parking candidate position, when the first parking candidate position and the second parking candidate position are detected and the first parking candidate position and the second parking candidate position overlap each other.

9 Claims, 9 Drawing Sheets

(51) Int. Cl.
*B60W 50/14* (2020.01)
*G06V 20/58* (2022.01)

(52) U.S. Cl.
CPC ..... *G06V 20/586* (2022.01); *B60W 2050/146* (2013.01); *B60W 2420/403* (2013.01)

(56) References Cited

U.S. PATENT DOCUMENTS 11,414,069 B1 * 8/2022 Ko .......................... G08G 1/148
11,475,769 B2 * 10/2022 Yata ...................... B60W 30/06
11,741,837 B2 * 8/2023 Vallance ................ G08G 1/146
340/932.2
2012/0092191 A1 * 4/2012 Stefik ..................... G08G 1/142
340/932.2
2014/0085109 A1 * 3/2014 Stefik ..................... G06Q 10/02
340/932.2
2014/0244070 A1 * 8/2014 Inagaki .............. B62D 15/0285
701/1
2014/0350855 A1 * 11/2014 Vishnuvajhala ......... G07C 1/30
701/538
2015/0130640 A1 * 5/2015 Ryu ....................... G08G 1/168
340/932.2
2015/0219463 A1 * 8/2015 Kang ................. G01C 21/3691
340/932.2
2016/0012726 A1 * 1/2016 Wang ................... G08G 1/0141
340/932.2
2016/0275794 A1 * 9/2016 Chang .................... G08G 1/144
2017/0132482 A1 * 5/2017 Kim ....................... G06F 3/0488
2018/0120851 A1 * 5/2018 Shin ................... B62D 15/0285
2018/0232958 A1 * 8/2018 Wang ..................... G06Q 20/42
2020/0388155 A1 * 12/2020 Mukaiyama ........... G08G 1/149
2020/0398825 A1 * 12/2020 Tsujino .................. G08G 1/143
2020/0398826 A1 12/2020 Tsujino et al.
2021/0114586 A1 * 4/2021 Graefe ................... G08G 1/147
2023/0213352 A1 * 7/2023 Kim ........................ G01S 17/10
701/409

* cited by examiner (FIG. 3 CONTINUED)
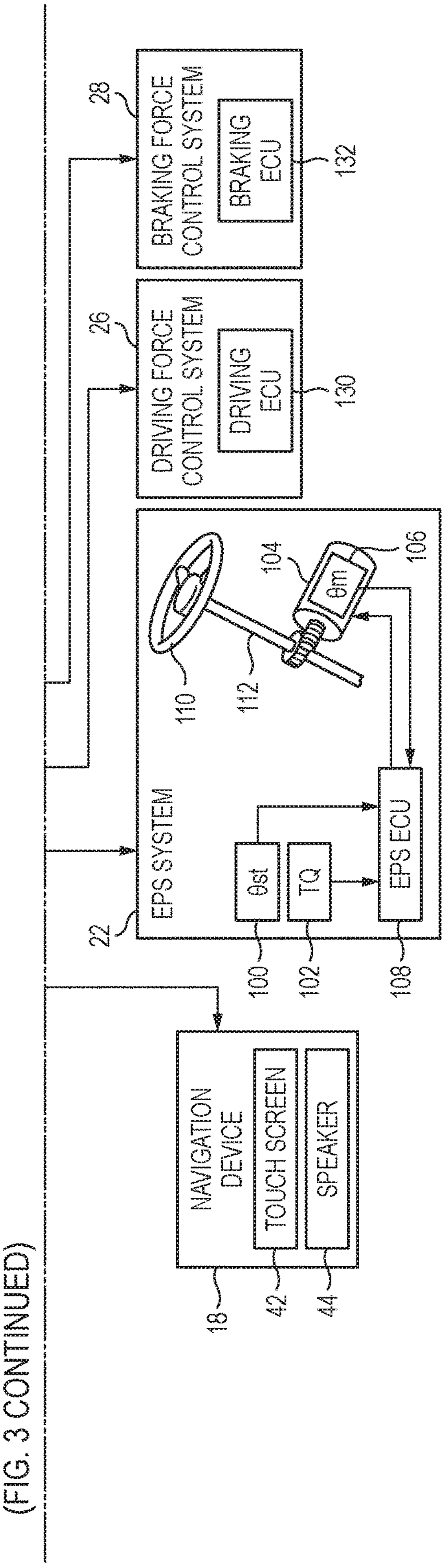

CONTROL DEVICE, CONTROL METHOD, AND COMPUTER-READABLE RECORDING MEDIUM

CROSS-REFERENCE TO RELATED APPLICATIONS

This application is based on and claims priority under 35 USC 119 from Japanese Patent Application No. 2022-056579 filed on Mar. 30, 2022, the contents of which are incorporated herein by reference.

TECHNICAL FIELD

The present disclosure relates to a control device, a control method, and a computer-readable recording medium.

BACKGROUND ART

In recent years, efforts have been made to provide access to sustainable transport systems that are considerate of vulnerable people in transport participants. In order to realize the above object, attention is focused on research and development to further improve safety and convenience of traffic through research and development related to automated driving.

The related art discloses autonomous parking control in which a parking space is detected and a vehicle is autonomously moved and parked in the detected parking space. In addition, the related art discloses autonomous parking control in which a designated parking space is registered in advance, the registered parking space is detected, and a vehicle is autonomously moved and parked.

Japanese Patent Application Laid-Open Publication No. 2021-000958 (hereinafter, referred to as Patent Literature 1) discloses a control device that, when a number of parking position candidates exceeding an upper limit number are detected, selects an upper limit number of parking position candidates from among the parking position candidates according to a predetermined rule and displays the selected upper limit number of parking position candidates on a display device. Japanese Patent Application Laid-Open Publication No. 2021-000972 (hereinafter, referred to as Patent Literature 2) discloses a control device that, when a plurality of parking position candidates partially overlapping each other are detected, displays the plurality of parking position candidates on a display device so as to partially overlap each other and to be selectable.

In autonomous driving technology, in a case where a normal parking space and a registered parking space are detected in the same parking area and overlap each other, when the vehicle is parked in the registered parking space, the visibility of display of the registered parking space may be reduced, or the display of the normal parking space may interfere with selection of the registered parking space. Patent Literature 1 and Patent Literature 2 do not disclose a countermeasure against this point. Therefore, in this regard, there is room for improvement in the related art.

The present disclosure provides a control device, a control method, and a computer-readable recording medium that stores a control program capable of easily selecting a registered parking space when a normal parking space and the registered parking space that overlap each other are detected. Further, the present disclosure contributes to development of sustainable transport systems.

SUMMARY

A first aspect of the present disclosure relates to a control device including circuitry configured to:

detect a first parking candidate position based on external environment recognition data of a moving body and a second parking candidate position registered in advance by a user of the moving body;

cause a display device to display detected parking candidate positions;

receive, from a user of the moving body, selection of a target parking position from among the displayed parking candidate positions, and park the moving body at the selected target parking position, in which the circuitry causes to display the second parking candidate position preferentially over the first parking candidate position, when the first parking candidate position and the second parking candidate position are detected and the first parking candidate position and the second parking candidate position overlap each other.

A second aspect of the present disclosure relates to a control method performed by a processor of a control device, including:

detecting a first parking candidate position based on external environment recognition data of a moving body and a second parking candidate position registered in advance by a user of the moving body;

causing a display device to display detected parking candidate positions;

receiving, from a user of the moving body, selection of a target parking position from among the displayed parking candidate positions; and parking the moving body at the selected target parking position, in which the control method includes causing to display the second parking candidate position preferentially over the first parking candidate position, when the first parking candidate position and the second parking candidate position are detected and the first parking candidate position and the second parking candidate position overlap each other in a case where the parking candidate positions are displayed on the display device.

A third aspect of the present disclosure relates to a non-transitory computer-readable recording medium that stores a control program for causing a processor of a control device to execute a process, the process including:

detecting a first parking candidate position based on external environment recognition data of a moving body and a second parking candidate position registered in advance by a user of the moving body;

causing a display device to display detected parking candidate positions;

receiving, from a user of the moving body, selection of a target parking position from among the displayed parking candidate positions; and parking the moving body at the selected target parking position, in which the process includes causing to display the second parking candidate position preferentially over the first parking candidate position when the first parking candidate position and the second parking candidate position are detected and the first parking candidate position and the second parking candidate position overlap each other in a case where the parking candidate positions are displayed on the display device.

According to the present disclosure, it is possible to provide a control device, a control method, and a computer-readable recording medium that stores a control program capable of easily selecting a registered parking space when a normal parking space and the registered parking space that overlap each other are detected.

BRIEF DESCRIPTION OF DRAWINGS

Exemplary embodiment(s) of the present disclosure will be described in detail based on the following figures, wherein.

DESCRIPTION OF EMBODIMENTS

Figure 1:
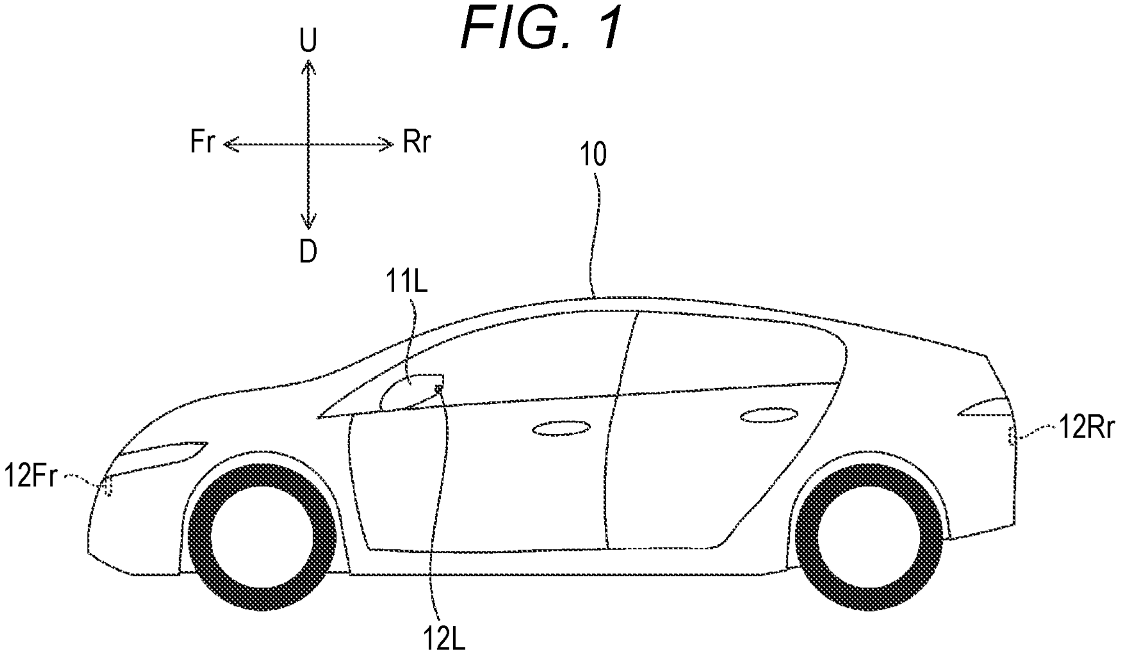
FIG. 1 is a side view showing an example of a vehicle on which a control device according to the present embodiment is mounted.

Hereinafter, an embodiment of a control device, a control method, and a computer-readable recording medium that stores a control program according to the present disclosure will be described with reference to the accompanying drawings. It should be noted that the drawings are viewed in directions of reference numerals. In addition, in the present specification and the like, in order to simplify and clarify the description, a front-rear direction, a left-right direction, and an upper-lower direction are described according to directions viewed from a driver of a vehicle 10 shown in FIGS. 1 and 2. In the drawings, a front side of the vehicle 10 is denoted by Fr, a rear side thereof is denoted by Rr, a left side thereof is denoted by L, a right side thereof is denoted by R, an upper side thereof is denoted by U, and a lower side thereof is denoted by D.

<Vehicle 10 on which Control Device of Present Disclosure is Mounted>

Figure 2:
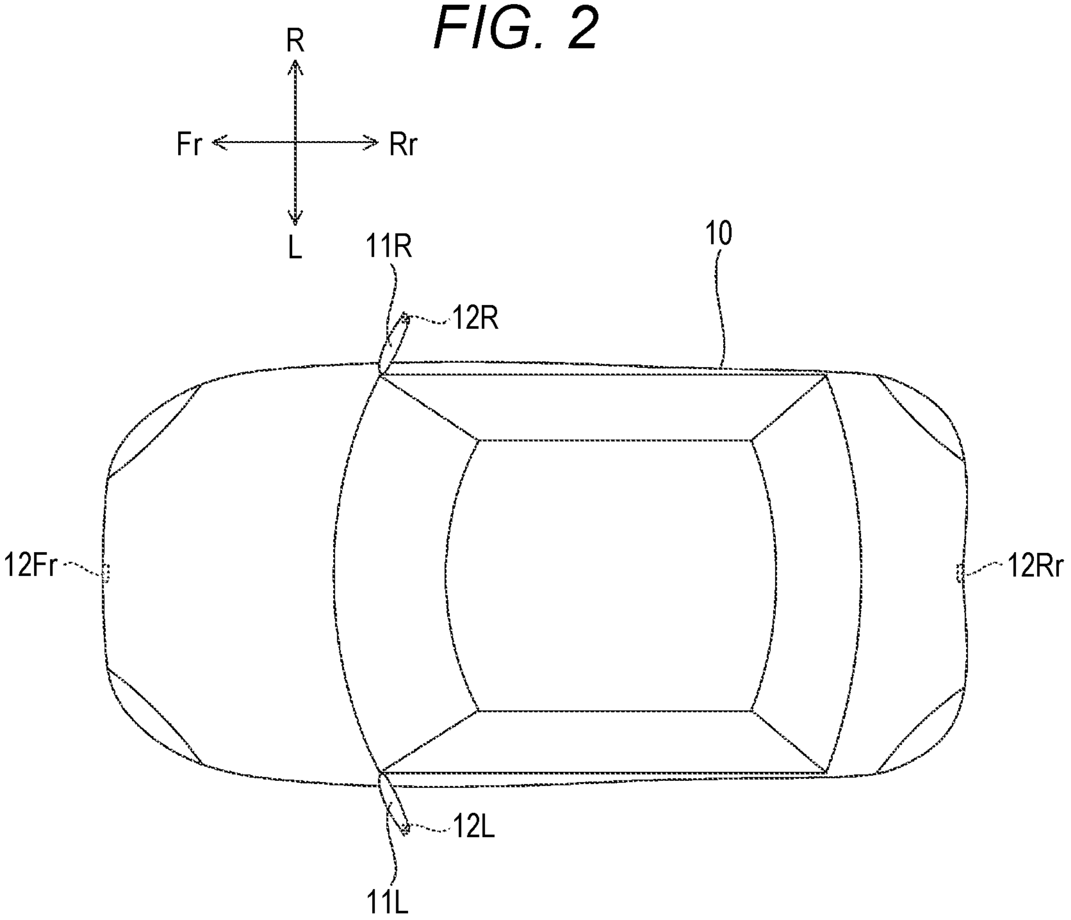
FIG. 2 is a top view of the vehicle shown in FIG. 1.

FIG. 1 is a side view of the vehicle 10 on which a control device according to the present disclosure is mounted. FIG. 2 is a top view of the vehicle 10 shown in FIG. 1. The vehicle 10 is an example of a moving object of the present disclosure.

The vehicle 10 is an automobile including a drive source (not shown) and wheels including driving wheels driven by power of the drive source and steerable steering wheels. In the present embodiment, the vehicle 10 is a four-wheeled automobile including a pair of left and right front wheels and a pair of left and right rear wheels. The drive source of the vehicle 10 is, for example, an electric motor. The drive source of the vehicle 10 may also be an internal combustion engine such as a gasoline engine or a diesel engine, or a combination of an electric motor and an internal combustion engine. In addition, the drive source of the vehicle 10 may drive the pair of left and right front wheels, may drive the pair of left and right rear wheels, or may drive four wheels, that is, the pair of left and right front wheels and the pair of left and right rear wheels. The front wheels and the rear wheels may both be the steerable steering wheels, or the front wheels or the rear wheels may be the steerable steering wheels.

The vehicle 10 further includes side mirrors 11L and 11R. The side mirrors 11L and 11R are mirrors (rearview mirrors) that are provided outside front seat doors of the vehicle 10 for a driver to check the rear side and a rear lateral side. Each of the side mirrors 11L and 11R is fixed to a body of the vehicle 10 by a rotation shaft extending in a vertical direction, and can be opened and closed by rotating about the rotation shaft.

The vehicle 10 further includes a front camera 12Fr, a rear camera 12Rr, a left side camera 12L, and a right side camera 12R. The front camera 12Fr is a digital camera that is provided at a front portion of the vehicle 10 and captures an image of the front side of the vehicle 10. The rear camera 12Rr is a digital camera that is provided at a rear portion of the vehicle 10 and captures an image of the rear side of the vehicle 10. The left side camera 12L is a digital camera that is provided on the left side mirror 11L of the vehicle 10 and captures an image of the left side of the vehicle 10. The right side camera 12R is a digital camera that is provided on the right side mirror 11R of the vehicle 10 and captures an image of the right side of the vehicle 10.

<Internal Configuration of Vehicle 10>

Figure 3:
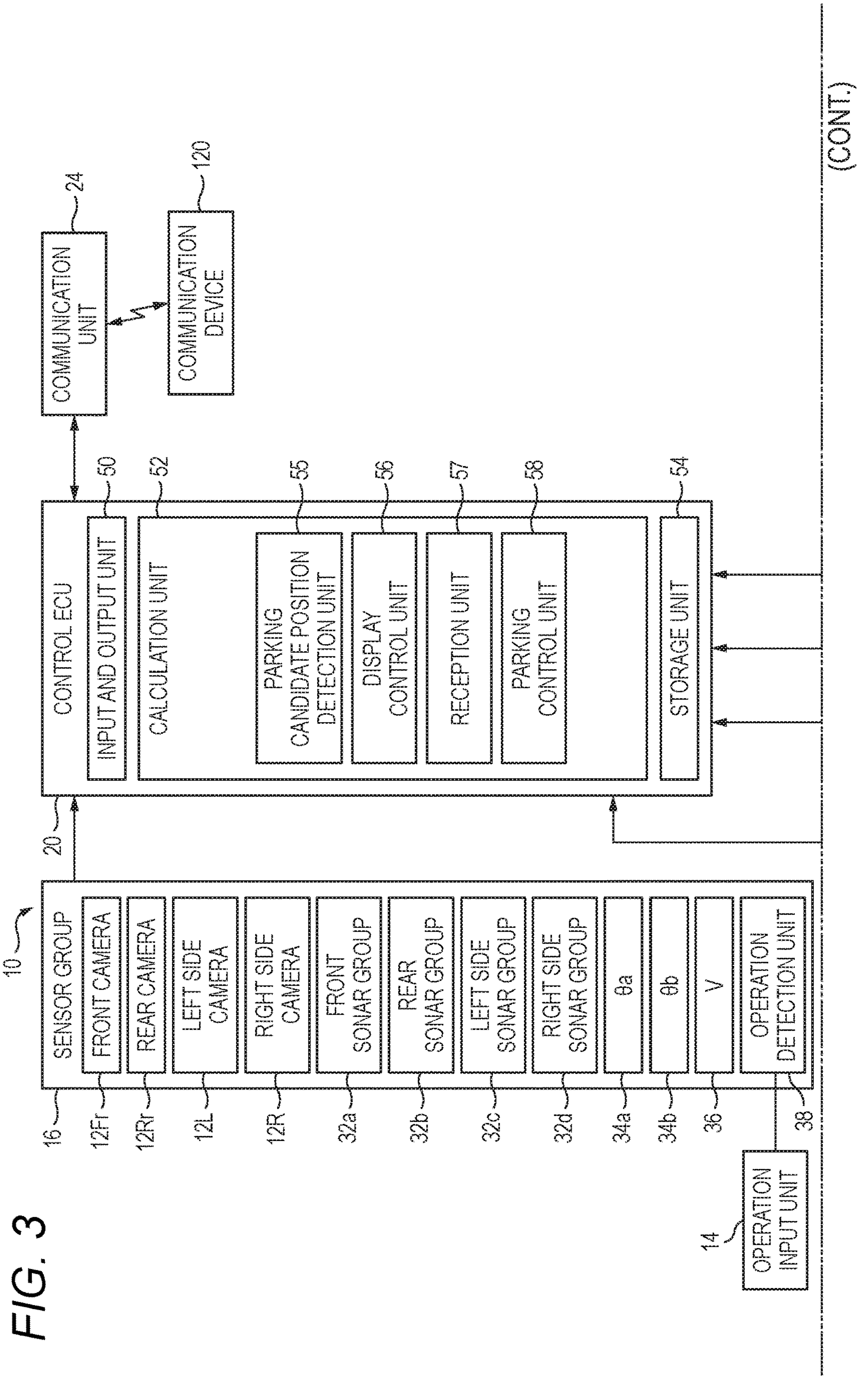
FIG. 3 is a block diagram showing an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28.

The sensor group 16 obtains various detection values used for control performed by the control ECU 20. The sensor group 16 includes the front camera 12Fr, the rear camera 12Rr, the left side camera 12L, and the right side camera 12R. The sensor group 16 includes a front sonar group 32*a*, a rear sonar group 32*b*, a left side sonar group 32*c*, and a right side sonar group 32*d*. The sensor group 16 includes wheel sensors 34*a* and 34*b*, a vehicle speed sensor 36, and an operation detection unit 38.

The front camera 12Fr, the rear camera 12Rr, the left side camera 12L, and the right side camera 12R obtain external environment recognition data (for example, peripheral image) for recognizing an external environment of the vehicle 10 by capturing images of a periphery of the vehicle 10. Peripheral images captured by the front camera 12Fr, the rear camera 12Rr, the left side camera 12L, and the right side camera 12R are referred to as a front image, a rear image, a left side image, and a right side image, respectively. An image formed by the left side image and the right side image may be referred to as a side image.

The front sonar group 32*a*, the rear sonar group 32*b*, the left side sonar group 32*c*, and the right side sonar group 32*d* emit sound waves to the periphery of the vehicle 10 and receive reflected sounds from other objects. The front sonar group 32*a* includes, for example, four sonars. The sonars constituting the front sonar group 32*a* are provided on an obliquely left front side, a front left side, a front right side, and an obliquely right front side of the vehicle 10, respectively. The rear sonar group 32*b* includes, for example, four sonars. The sonars constituting the rear sonar group 32*b* are provided on an obliquely left rear side, a rear left side, a rear right side, and an obliquely right rear side of the vehicle 10, respectively. The left side sonar group 32*c* includes, for example, two sonars. The sonars constituting the left side sonar group 32*c* are provided on a front side and a rear side of a left side portion of the vehicle 10, respectively. The right sonar group 32*d* includes, for example, two sonars. The sonars constituting the right side sonar group 32*d* are provided on a front side and a rear side of a right side portion of the vehicle 10, respectively.

The wheel sensors 34*a* and 34*b* detect rotation angles of the wheels of the vehicle 10. The wheel sensors 34*a* and 34*b* may be configured with angle sensors or displacement sensors. The wheel sensors 34*a* and 34*b* output detection pulses each time the wheels rotate by predetermined angles. The detection pulses output from the wheel sensors 34*a* and 34*b* are used to calculate the rotation angles of the wheels and rotation speeds of the wheels. A movement distance of the vehicle 10 is calculated based on the rotation angles of the wheels. The wheel sensor 34*a* detects, for example, a rotation angle θa of the left rear wheel. The wheel sensor 34*b* detects, for example, a rotation angle θb of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a transmission countershaft.

The operation detection unit 38 detects an operation content performed by a user using an operation input unit 14, and outputs the detected operation content to the control ECU 20. The operation input unit 14 includes, for example, various user interfaces such as a side mirror switch for switching between an opened state and a closed state of the side mirrors 11L and 11R, and a shift lever (a select lever or a selector).

The navigation device 18 detects a current position of the vehicle 10 by using, for example, a global positioning system (GPS), and guides the user to a route to a destination. The navigation device 18 includes a storage device (not shown) that includes a map information database.

The navigation device 18 includes a touch screen 42 and a speaker 44. The touch screen 42 functions as an input device and a display device of the control ECU 20. The speaker 44 outputs various types of guide information to the user (an occupant) of the vehicle 10 by audio.

The touch screen 42 is configured to input various commands to the control ECU 20. For example, the user can input a command related to movement assistance of the vehicle 10 via the touch screen 42. The movement assistance includes parking assistance and exit assistance of the vehicle 10. The touch screen 42 is configured to display various screens related to a control content of the control ECU 20. For example, a screen related to the movement assistance of the vehicle 10 is displayed on the touch screen 42. Specifically, a parking assistance button for requesting the parking assistance of the vehicle 10 and an exit assistance button for requesting the exit assistance are displayed on the touch screen 42. The parking assistance button includes an autonomous parking button for requesting parking by autonomous steering of the control EC U 20 and a guidance parking button for requesting guidance when parking the vehicle by an operation of the driver. The exit assistance button includes an autonomous exit button for requesting exit by the autonomous steering of the control ECU 20 and a guidance exit button for requesting guidance when the exit of the vehicle is performed by an operation of the driver. Constituent elements other than the touch screen 42, for example, an information terminal such as a smartphone or a tablet terminal may be used as the input device or the display device.

The "parking" is synonymous with, for example, "parking the moving body". For example, the "parking" is a stop accompanied by getting on and off of an occupant, and excludes a temporary stop due to a traffic signal or the like. The "parking position" is a position at which the moving body is stopped, that is, a position for parking.

The control ECU 20 includes an input and output unit 50, a calculation unit 52, and a storage unit 54. The calculation unit 52 is implemented by, for example, a central processing unit (CPU). The calculation unit 52 performs various types of control by controlling each unit based on a program stored in the storage unit 54. Further, the calculation unit 52 inputs and outputs a signal from and to units connected to the control ECU 20 via the input and output unit 50. The calculation unit 52 is an example of the control device of the present disclosure.

The calculation unit 52 includes a parking candidate position detection unit 55 that detects parking candidate positions of the vehicle 10, a display control unit 56 that displays the detected parking candidate positions on a display device, a reception unit 57 that receives a target parking position selected from among the parking candidate positions, and a parking control unit 58 that parks the vehicle 10 at the selected target parking position.

The parking candidate position detection unit 55 detects a parking candidate position at which the vehicle 10 is parked based on the external environment recognition data. The parking candidate positions include a normal parking candidate position and a registered parking candidate position. The normal parking candidate position is an example of a first parking candidate position of the present disclosure. The registered parking candidate position is an example of a second parking candidate position of the present disclosure.

The normal parking candidate position is a parking space in which the vehicle 10 can be parked in a space detected based on the external environment recognition data. The normal parking candidate position is detected based on, for example, frame line recognition for recognizing a parking frame or space recognition for recognizing a vacant parking space. The parking frame is a white line frame or the like displayed in the parking lot for parking the vehicle. The vacant parking space is, for example, a space in which the vehicle can be simply parked.

The registered parking candidate position is a parking space registered as the designated parking position in the past by the user of the vehicle 10 in the space detected based on the external environment recognition data. The designated parking position refers to a parking position specific to the user, for example, a parking space where the vehicle 10 of the user is frequently parked. The designated parking position includes, for example, a monthly parking lot, a home parking lot, and a coin-operated parking lot with high parking frequency. The registered parking candidate position is detected based on comparison of the feature points of the external environment recognition data for the parking position.

The parking candidate position detection unit 55 registers a predetermined parking position designated by the user as a designated parking position in the storage unit 54. The parking candidate position detection unit 55 registers the feature points in the external environment recognition data of the vehicle 10 in association with the designated parking position to be registered. The external environment recognition data for detecting the feature points is the peripheral images of the periphery of the vehicle 10 captured by the front camera 12Fr, the rear camera 12Rr, the left side camera 12L, and the right side camera 12R. The feature points related to the designated parking position include feature points of the designated parking position itself, feature points in the periphery of the designated parking position, and the like. Examples of the feature points of the designated parking position itself include feature points in which a character "parking" is displayed in the designated parking position. Examples of the feature points in the periphery of the designated parking position include characteristic buildings and obstacles present in the periphery. The designated parking position is registered in the storage unit 54 as a map including feature points in the peripheral image of the vehicle 10.

The parking candidate position detection unit 55 detects the registered parking candidate position by comparing the feature points of the external environment recognition data for the currently detected parking position with the feature points of the external environment recognition data for the designated parking position registered by the user in the past. When it is determined that a matching rate between the feature points of the current external environment recognition data and the feature points of the past external environment recognition data is equal to or greater than a threshold value, the parking candidate position detection unit 55 detects a parking space registered as the designated parking position by the user in the past as the registered parking candidate position.

The display control unit 56 displays parking candidate positions detected by the parking candidate position detection unit 55 on the touch screen 42. When the normal parking candidate position and the registered parking candidate position are detected in the same external environment recognition data by the detection of the parking candidate positions based on the external environment recognition data and the normal parking candidate position and the registered parking candidate position overlap each other, the display control unit 56 displays the registered parking candidate position on the touch screen 42 preferentially over the normal parking candidate position.

For example, when the normal parking candidate position and the registered parking candidate position are detected in the same external environment recognition data by the detection of the parking candidate position based on the external environment recognition data and the normal parking candidate position and the registered parking candidate position overlap each other, the display control unit 56 displays the normal parking candidate position on the touch screen 42 in a display mode inconspicuous than a display mode of the normal parking candidate position when the normal parking candidate position and the registered parking candidate position do not overlap each other. The inconspicuous display mode includes, for example, a display mode in which transmittance is increased, a display mode in which a display color is thinned, and a display mode in which the display color is close to a background color in an image. In this case, the display control unit 56 may display the registered parking candidate position on the touch screen 42 in a display mode that is more conspicuous than a display mode of the registered parking candidate position when the normal parking candidate position and the registered parking candidate position do not overlap each other.

For example, when the normal parking candidate position and the registered parking candidate position are detected in the same external environment recognition data by the detection of the parking candidate positions based on the external environment recognition data and the normal parking candidate position and the registered parking candidate position overlap each other, the display control unit 56 hides the normal parking candidate position overlapping the registered parking candidate position on the touch screen 42.

When the normal parking candidate position and the registered parking candidate position are detected in the same external environment recognition data by the detection of the parking candidate positions based on the external environment recognition data and the normal parking candidate position and the registered parking candidate position do not overlap each other, the display control unit 56 displays both the normal parking candidate position and the registered parking candidate position on the touch screen 42.

When the normal parking candidate position and the registered parking candidate position are detected in the same external environment recognition data by the detection of the parking candidate positions based on the external environment recognition data and the normal parking candidate position and the registered parking candidate position do not overlap each other, the display control unit 56 displays the normal parking candidate position and the registered parking candidate position on the touch screen 42 in different modes. The different modes include, for example, different display colors, different thicknesses of display lines, and the like.

The reception unit 57 receives the parking candidate position selected by the user from among the parking candidate positions displayed on the touch screen 42 as a target parking position of the vehicle 10.

The parking control unit 58 performs the parking assistance of the vehicle 10 by autonomous steering in which a steering 110 is autonomously operated under control of the parking control unit 58. In the assistance of the autonomous steering, an accelerator pedal (not shown), a brake pedal (not shown), and the operation input unit 14 are autonomously operated. The parking control unit 58 performs guide assistance when the driver manually parks the vehicle 10 by operating the accelerator pedal, the brake pedal, and the operation input unit 14.

For example, the parking control unit 58 performs autonomous parking control for parking the vehicle 10 at the target parking position (the selected predetermined parking candidate position) based on the external environment recognition data of the vehicle 10 obtained by the front camera 12Fr, the rear camera 12Rr, the left side camera 12L, and the right side camera 12R and the predetermined parking candidate position selected by the user.

The EPS system 22 includes a steering angle sensor 100, a torque sensor 102, an EPS motor 104, a resolver 106, and an EPS ECU 108. The steering angle sensor 100 detects a steering angle $\theta st$ of the steering 110. The torque sensor 102 detects a torque TQ applied to the steering 110.

The EPS motor 104 applies a driving force or a reaction force to a steering column 112 connected to the steering 110, thereby enabling assistance of an operation performed by an occupant on the steering 110 and enabling the autonomous steering during the parking assistance. The resolver 106 detects a rotation angle $\theta m$ of the EPS motor 104. The EPS ECU 108 controls the entire EPS system 22. The EPS ECU 108 includes an input and output unit (not shown), a calculation unit (not shown), and a storage unit (not shown).

The communication unit 24 enables wireless communication with the other communication device 120. The other communication device 120 is a base station, a communication device of another vehicle, an information terminal such as a smartphone carried by the occupant of the vehicle 10, or the like.

The driving force control system 26 includes a driving ECU 130. The driving force control system 26 executes driving force control on the vehicle 10. The driving ECU 130 controls a driving force of the vehicle 10 by controlling an engine (not shown) or the like based on an operation performed by the user on the accelerator pedal (not shown).

The braking force control system 28 includes a braking ECU 132. The braking force control system 28 executes braking force control on the vehicle 10. The braking ECU 132 controls a braking force of the vehicle 10 by controlling a brake mechanism (not shown) or the like based on an operation performed on the brake pedal (not shown) by the user.

<Registration of Designated Parking Position>

Next, a designated parking position of the vehicle 10 registered by the user will be described with reference to FIGS. 4 to 6.

Figure 4:
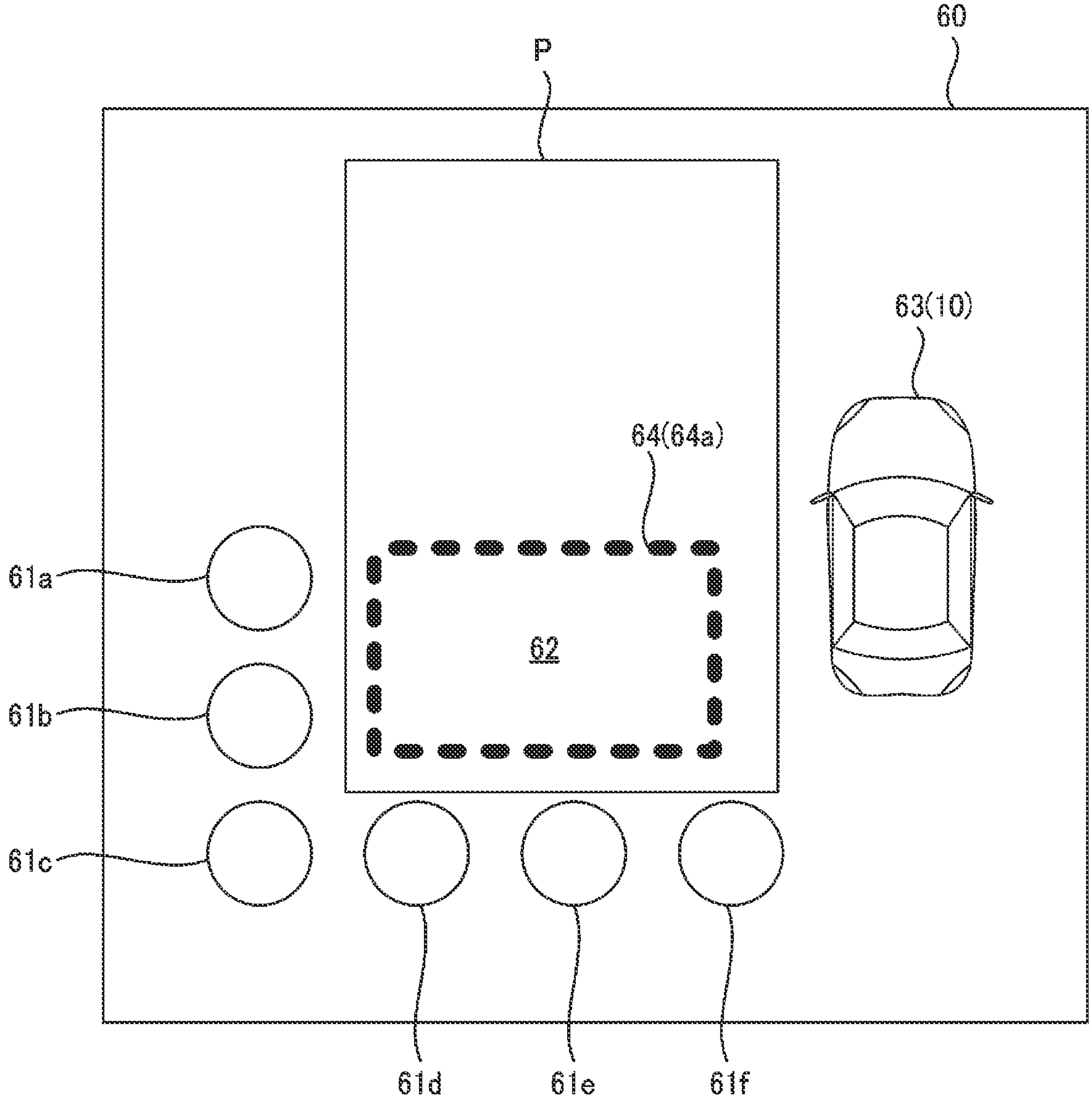
FIG. 4 is a diagram in which a designated parking position is set in a top view image generated based on a captured image of a camera.

FIG. 4 shows an example of a top view image 60 (a synthesized image) generated from the external environment recognition data of the vehicle 10 obtained by the front camera 12Fr, the rear camera 12Rr, the left side camera 12L, and the right side camera 12R. The top view image 60 is displayed on the touch screen 42 of the vehicle 10, for example. In the top view image 60 shown in FIG. 4, a parking lot P and a plurality of plantings (obstacles) 61*a* to 61*f* are imaged. The user of the vehicle 10 rents a parking area 62 set on the side of the obstacles 61*a* to 61*f* in the parking lot P as a monthly parking lot. The vehicle stopped in front of the parking lot P is an image showing a state in which the vehicle 10 is viewed from above, and is a vehicle image 63 generated (captured) in advance and stored in the storage unit 54 or the like.

For example, the user can register the parking area 62 as a designated parking position 64 by manual setting by performing a touch operation on the touch screen 42. In the manual setting of the designated parking position 64, a rectangular broken line frame 64*a* displayed on the touch screen 42 is moved by the touch operation to enclose the parking area 62 as shown in FIG. 4. Accordingly, the broken line frame 64*a* set to enclose the parking area 62 is set as the designated parking position 64.

Figure 5:
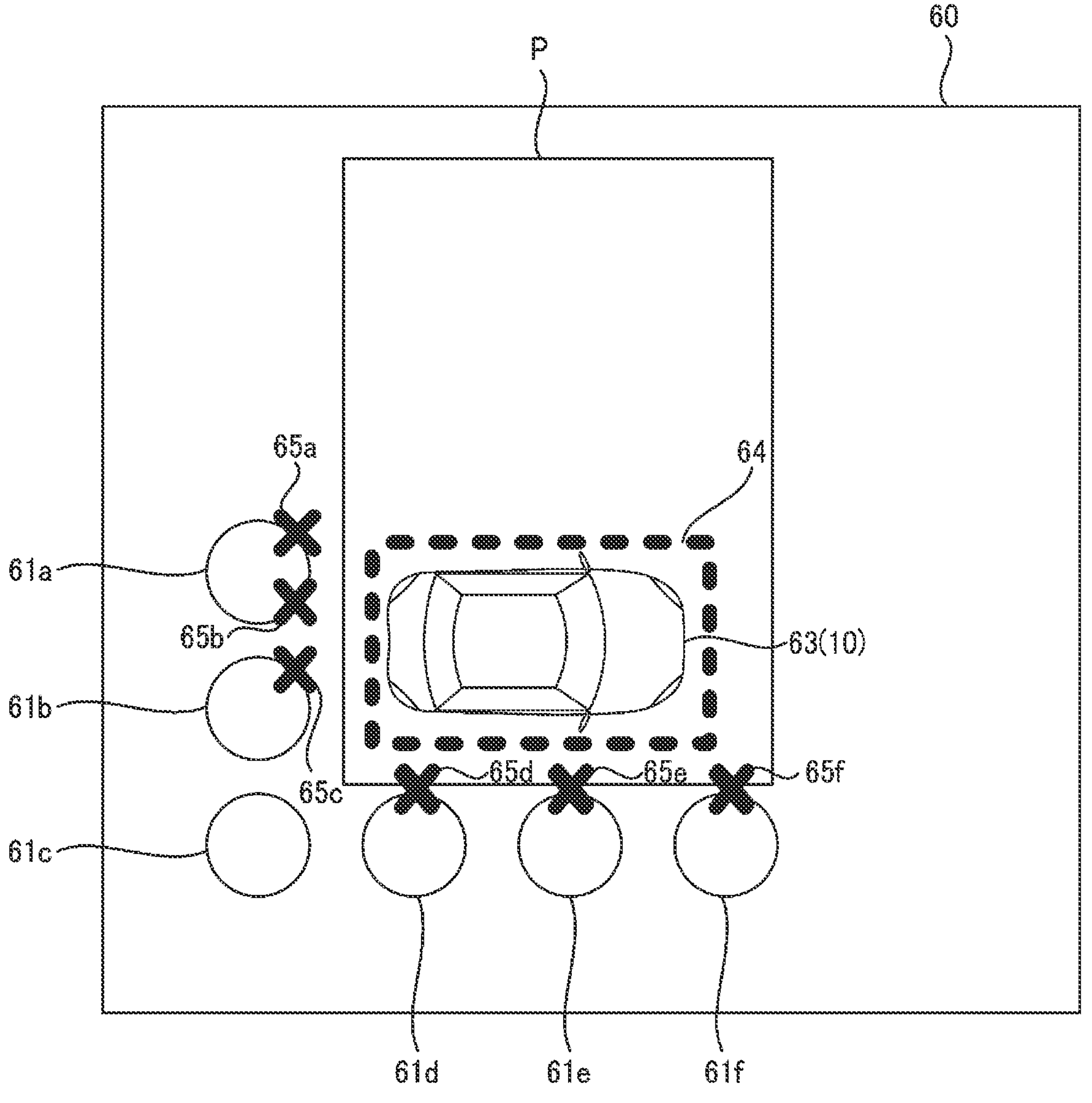
FIG. 5 shows feature points in a periphery of the designated parking position shown in FIG. 4.

FIG. 5 shows feature points in a periphery of the designated parking position 64 shown in FIG. 4. When the designated parking position 64 is set, feature points for the designated parking position 64 is detected by the parking candidate position detection unit 55 in the external environment recognition data obtained by the front camera 12Fr, the rear camera 12Rr, the left side camera 12L, and the right side camera 12R. For example, as shown in FIG. 5, obstacle feature points 65*a* to 65*f* indicating positions of the obstacles 61*a* to 61*f* existing around the designated parking position 64 are detected by the parking candidate position detection unit 55 as the feature points for the designated parking position 64. FIG. 5 shows a state in which the vehicle 10 is parked at the designated parking position 64.

Figure 6:
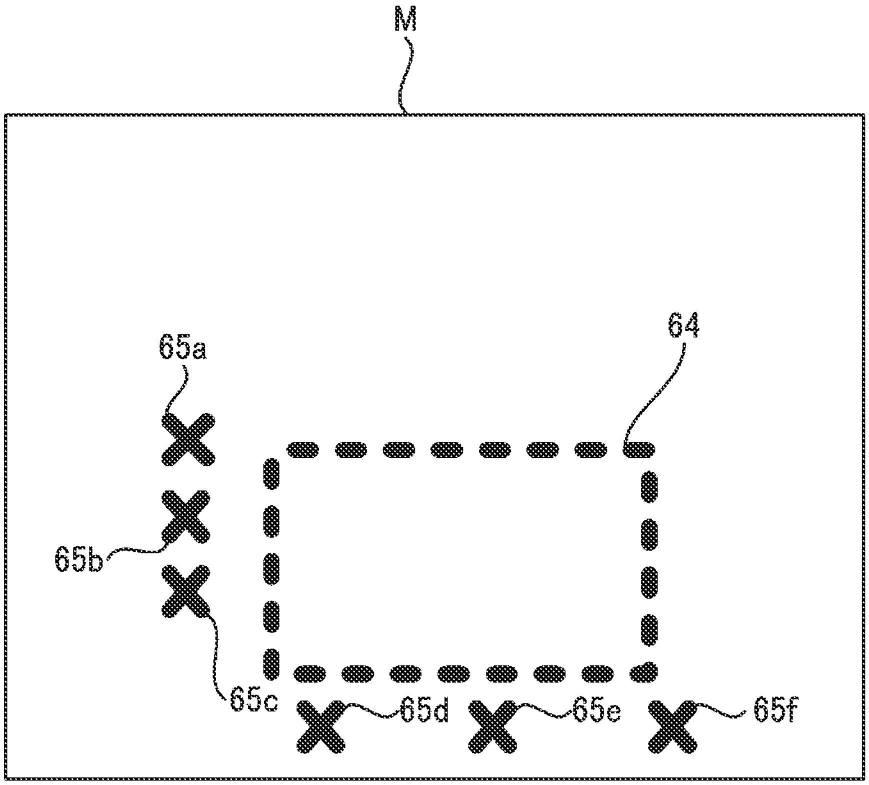
FIG. 6 shows an example of a map of a designated parking position registered in a storage unit.

FIG. 6 shows an example of a map of the designated parking position 64 registered in the storage unit 54. When the feature points (the obstacle feature points 65*a* to 65*f*) for the designated parking position 64 are detected, as shown in FIG. 6, the designated parking position 64 is registered in the storage unit 54 as a map M indicating a relationship between the detected obstacle feature points 65*a* to 65*f* and the designated parking position 64 manually set.

Control Example of Calculation Unit 52 During Autonomous Parking

Figure 7:
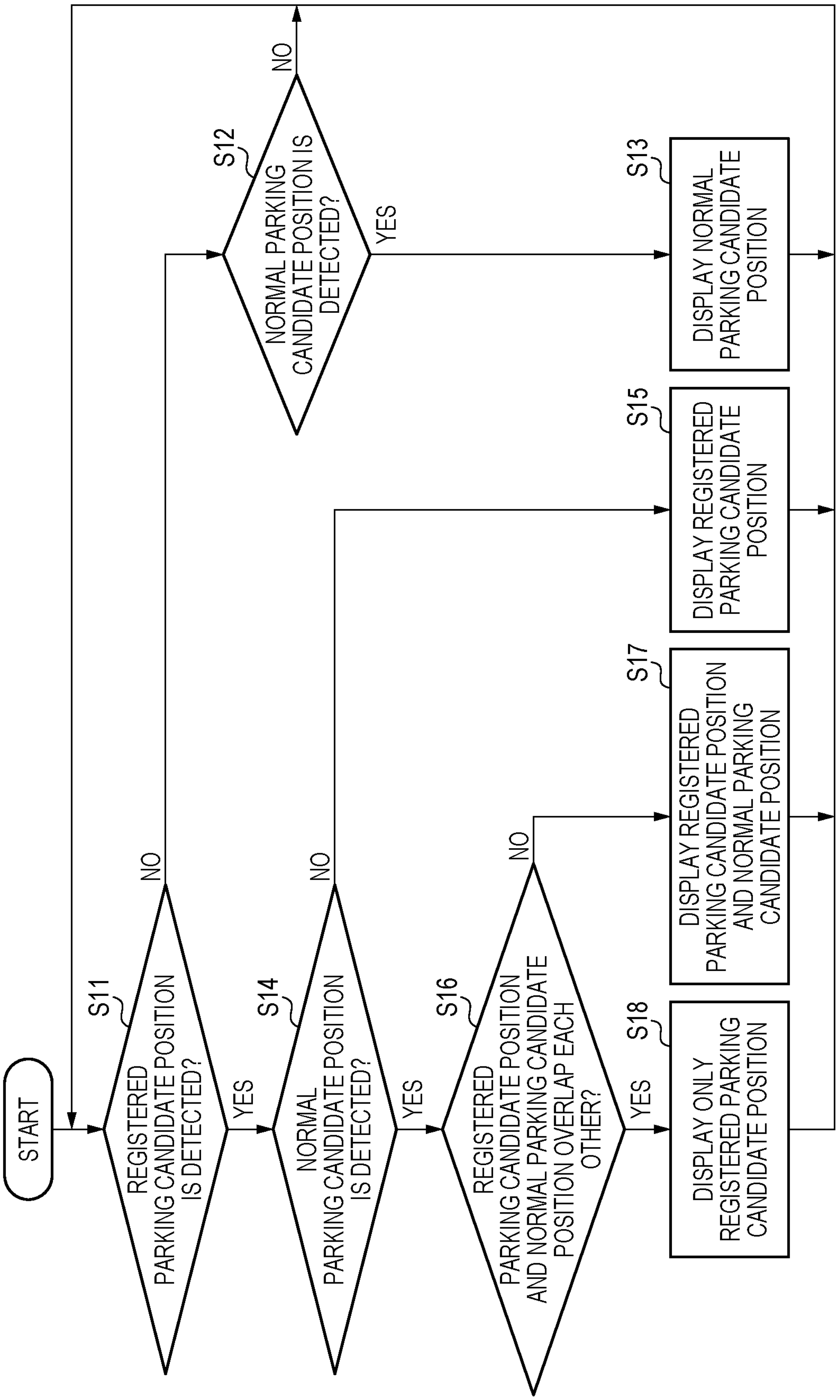
FIG. 7 is a flowchart showing an example of display control of a parking candidate position during autonomous parking.

Next, an example of display control of a parking candidate position performed by the calculation unit 52 during autonomous parking will be described with reference to a flowchart shown in FIG. 7. When the autonomous parking button displayed on the touch screen 42 is touched, the calculation unit 52 starts the processing shown in FIG. 7. The autonomous parking button is touched, for example, when the user who is to park the vehicle 10 comes near the parking lot.

First, the parking candidate position detection unit 55 of the calculation unit 52 determines whether the registered parking candidate position is detected in the parking lot based on the external environment recognition data of the vehicle 10 obtained by the front camera 12Fr, the rear camera 12Rr, the left side camera 12L, and the right side camera 12R (step S11). As described above, the registered parking candidate position is detected by comparing feature points of external environment recognition data for a parking position detected in the current parking lot with the feature points of the external environment recognition data for the designated parking position registered by the user in the past and determining whether the matching rate of the feature points exceeds the threshold value.

In step S11, when the registered parking candidate position is not detected (step S11: No), the parking candidate position detection unit 55 determines whether the normal parking candidate position is detected in the parking lot (step S12). As described above, the normal parking candidate position is a parking space in which the vehicle 10 can be parked, which is detected based on a parking frame, a vacant parking space, or the like.

In step S12, when the normal parking candidate position is not detected, that is, when neither the registered parking candidate position nor the normal parking candidate position is detected (step S12: No), the parking candidate position detection unit 55 returns to step S11 and executes each processing.

In step S12, when the normal parking candidate position is detected, that is, when the registered parking candidate position is not detected but only the normal parking candidate position is detected (step S12: Yes), the display control unit 56 of the calculation unit 52 displays the detected normal parking candidate position in the parking lot in the top view image in the periphery of the vehicle 10 displayed on the touch screen 42 (step S13). Display of the normal parking candidate position and the registered parking candidate position will be described later with reference to FIGS. 8 and 9.

On the other hand, in step S11, when the registered parking candidate position is detected (step S1: Yes), the parking candidate position detection unit 55 determines whether the normal parking candidate position is detected in the parking lot (step S14).

In step S14, when the normal parking candidate position is not detected, that is, when the registered parking candidate position is detected but the normal parking candidate position is not detected (step S14: No), the display control unit 56 displays the detected registered parking candidate position in the parking lot in the top view image displayed on the touch screen 42 (step S15).

In step S14, when the normal parking candidate position is detected, that is, when both the registered parking candidate position and the normal parking candidate position are detected (step S14: Yes), the parking candidate position detection unit 55 determines whether the detected registered parking candidate position and the normal parking candidate position overlap each other (step S16). The case where the registered parking candidate position and the normal parking candidate position overlap each other includes not only a case where both the parking candidate positions match each other but also a case where the parking candidate positions overlap each other at least partly.

In step S16, when the registered parking candidate position and the normal parking candidate position do not overlap each other, that is, when the registered parking candidate position and the normal parking candidate position are detected at positions separated from each other in the parking lot (step S16: No), the display control unit 56 displays each of the detected registered parking candidate position and the detected normal parking candidate position in the parking lot in the top view image displayed on the touch screen 42 (step S17). The registered parking candidate position and the normal parking candidate position may be displayed, for example, in different display colors or different thicknesses of display lines.

In step S16, when the registered parking candidate position and the normal parking candidate position overlap each other (step S16: Yes), the display control unit 56 displays only the registered parking candidate position in the parking lot in the top view image displayed on the touch screen 42 without displaying the normal parking candidate position (step S18). Although only the registered parking candidate position is displayed in this example, the present disclosure is not limited thereto. For example, in order to facilitate recognition of the registered parking candidate position, the display control unit 56 may perform display in a mode in which display transmittance of the normal parking candidate position is increased, a mode in which a display color is thinned, a display mode in which the display color is close to a background color in an image, or the like.

By displaying the registered parking candidate position and the normal parking candidate position on the touch screen 42 in this way, the registered parking candidate position can be easily visually recognized and easily selected by the user.

<Display of Parking Candidate Positions after Registration of Designated Parking Position>

Next, a display example of the parking candidate positions when the vehicle 10 is parked in the parking lot in which the designated parking position of the vehicle 10 is registered will be described with reference to FIGS. 8 and 9.

Figure 8:
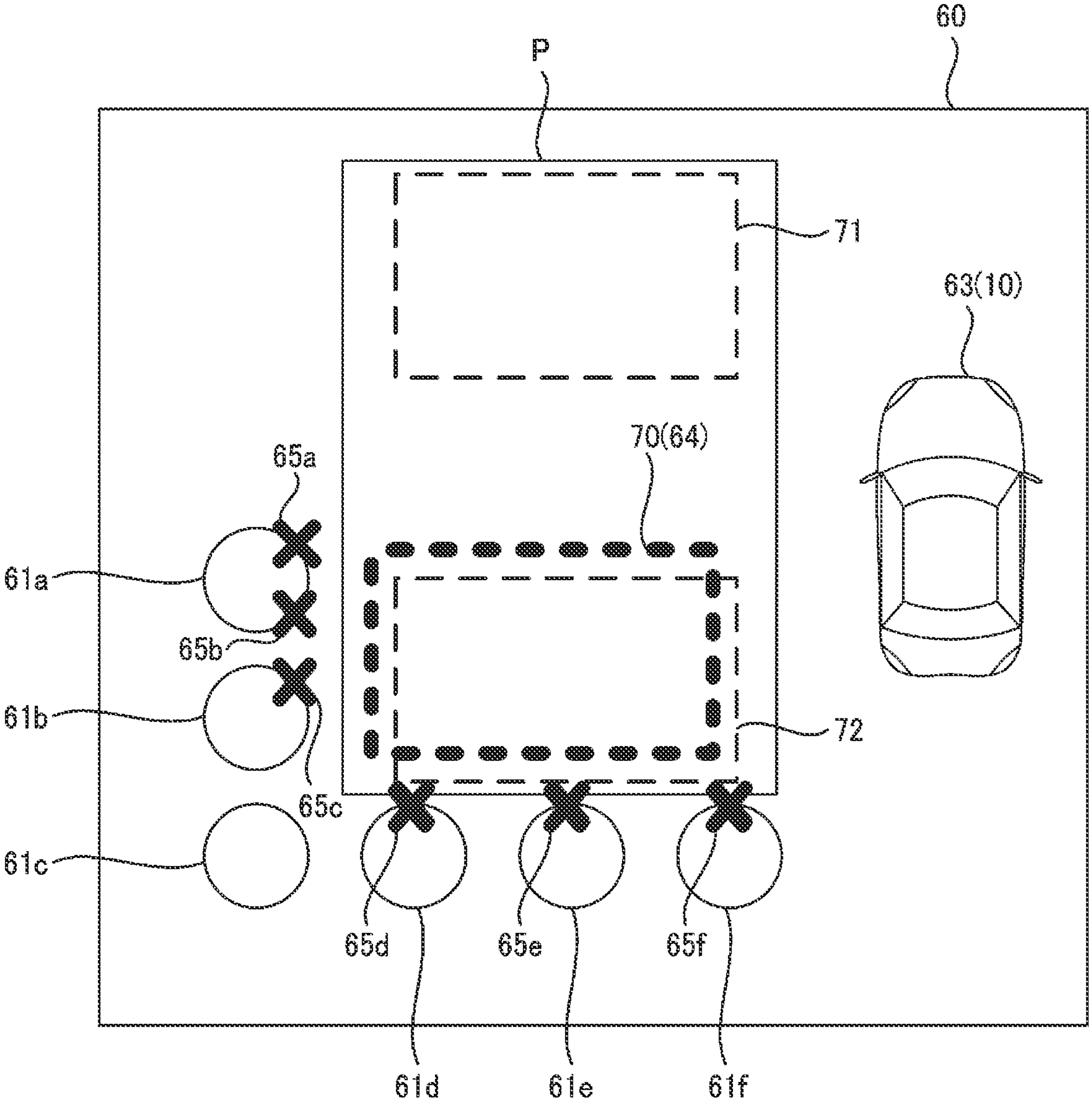
FIG. 8 shows an example of parking candidate positions detected in a parking lot.

FIG. 8 shows an example of parking candidate positions detected by the parking candidate position detection unit 55 in a parking lot P. The parking lot P shown in FIG. 8 is the same parking lot as the parking lot P described with reference to FIGS. 4 to 6. The user of the vehicle 10 autonomously parks the vehicle 10 in the parking lot P. As described with reference to FIGS. 4 to 6, the parking area 62 is registered as the designated parking position 64 for the parking lot P in the storage unit 54 of the vehicle 10.

As shown in FIG. 8, the parking candidate position detection unit 55 detects two normal parking candidate positions 71 and 72 and a registered parking candidate position 70 in the parking lot P based on the external environment recognition data of the vehicle 10 obtained by the front camera 12Fr, the rear camera 12Rr, the left camera 12L, and the right camera 12R The parking candidate position detection unit 55 detects the normal parking candidate positions 71 and 72 as vacant parking spaces in which the vehicle 10 can be parked by space recognition at both ends of the parking lot P. The parking candidate position detection unit 55 detects the registered parking candidate position 70 based on comparison of feature points of external environment recognition data for the parking position. In the case of the example illustrated in the figure, the parking candidate position detection unit 55 detects the registered parking candidate position 70 by comparing the obstacle feature points 65*a* to 65*f* which are the feature points of the external environment recognition data for the parking position detected in the current parking lot P with the map M (see FIG. 6) indicating the feature points of the external environment recognition data for, for example, the designated parking position 64 registered by the user in the past. When it is determined that the matching rate of both feature points is equal to or greater than the threshold value, the parking candidate position detection unit 55 detects the designated parking position 64 as the registered parking candidate position 70. As shown in FIG. 8, the registered parking candidate position 70 in this example is detected at a position overlapping the normal parking candidate position 72.

Figure 9:
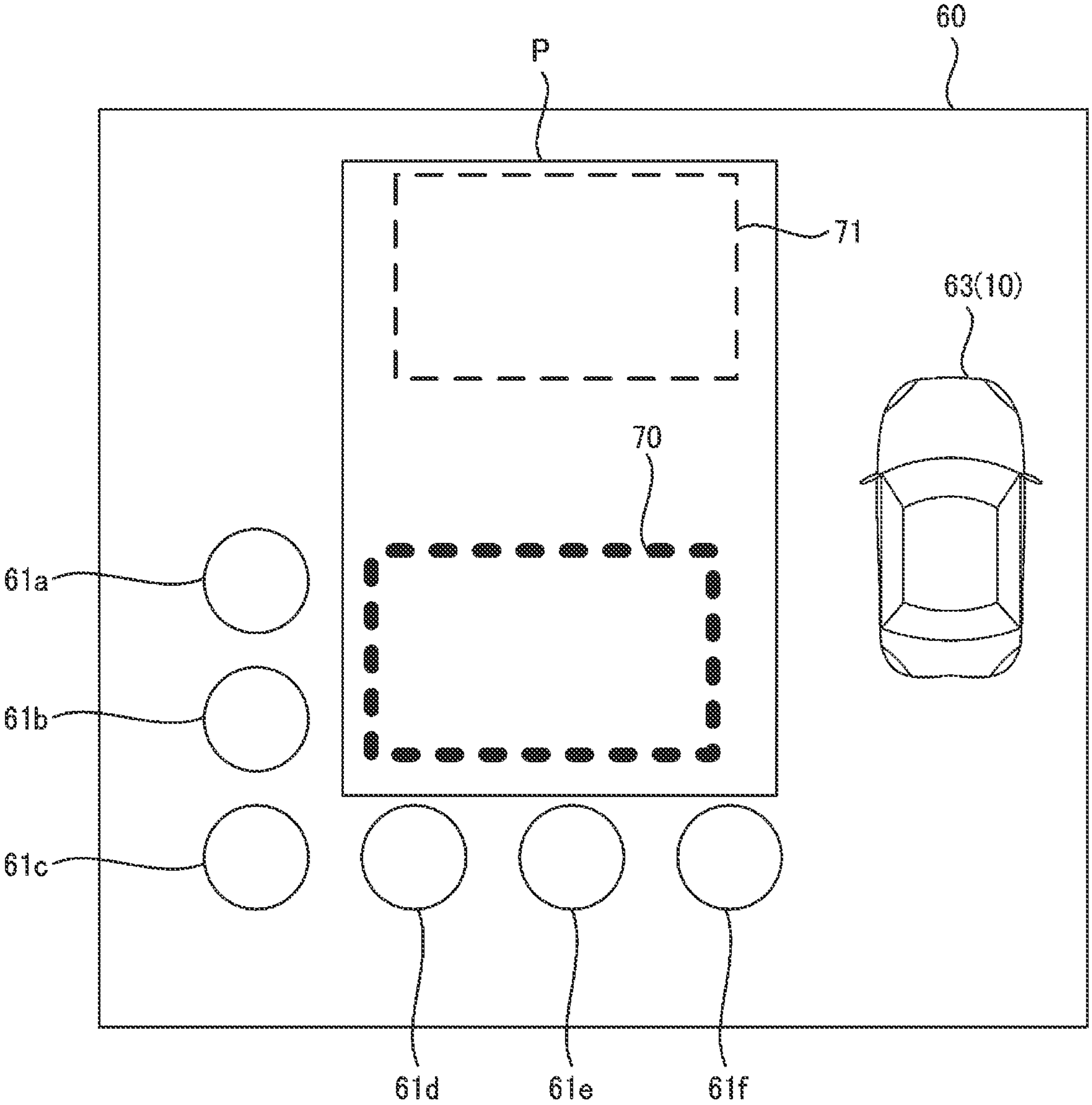
FIG. 9 shows an example in which a registered parking candidate position is preferentially displayed in the parking candidate positions in FIG. 8.

FIG. 9 shows an example of a state in which the normal parking candidate positions 71 and 72 and the registered parking candidate position 70 detected as in FIG. 8 are actually displayed in the top view image 60 on the touch screen 42. As shown in FIG. 9, the display control unit 56 displays the normal parking candidate position 71 and the registered parking candidate position 70 in the parking lot P. That is, when the normal parking candidate positions 71 and 72 and the registered parking candidate position 70 are detected in the parking lot P and the normal parking candidate position 72 and the registered parking candidate position 70 overlap each other, the display control unit 56 hides the normal parking candidate position 72 overlapping the registered parking candidate position 70 and displays only the registered parking candidate position 70. Further, the normal parking candidate position 71 that does not overlap the registered parking candidate position 70 is displayed in a normal display mode. As described above, a display mode when the normal parking candidate position 72 and the registered parking candidate position 70 overlap each other may be, for example, the mode in which the display transmittance of the normal parking candidate position 72 is increased, the mode in which the display color is thinned, or the display mode in which the display color is close to the background color in the image. The display examples of FIGS. 8 and 9 correspond to the display of step S18 in FIG. 7. The user selects a position at which the vehicle 10 is parked from the registered parking candidate position 70 and the normal parking candidate position 71 displayed in this way.

As described above, when the normal parking candidate positions 71 and 72 and the registered parking candidate position 70 are detected in the same external environment recognition data by the detection of the parking candidate positions based on the external environment recognition data and the detected normal parking candidate position 72 and the registered parking candidate position 70 overlap each other, the display control unit 56 of the calculation unit 52 displays the registered parking candidate position 70 preferentially over the normal parking candidate position 72. Accordingly, it is possible to prevent a situation in which the registered parking candidate position 70 is difficult to be visually recognized or selected due to the display of the normal parking candidate position 72 even though the registered parking candidate position 70 registered by the user in the past, for example, the parking area 62 registered as the monthly parking lot is detected.

For example, when the normal parking candidate positions 71 and 72 and the registered parking candidate position 70 are detected in the same external environment recognition data by the detection of the parking candidate position based on the external environment recognition data and the detected normal parking candidate position 72 and the registered parking candidate position 70 overlap each other, the display control unit 56 displays the normal parking candidate position 72 in a display mode inconspicuous than a display mode of the normal parking candidate position 72 when the normal parking candidate position 72 and the registered parking candidate position 70 do not overlap each other. Accordingly, it is possible to prevent a situation in which the registered parking candidate position 70 is difficult to be visually recognized due to the display of the normal parking candidate position 72, and for example, it is possible to autonomously park the vehicle in the parking area 62 registered as the monthly parking lot accurately.

For example, when the normal parking candidate positions 71 and 72 and the registered parking candidate position 70 are detected in the same external environment recognition data by the detection of the parking candidate positions based on the external environment recognition data and the detected normal parking candidate position 72 and the registered parking candidate position 70 overlap each other, the display control unit 56 hides the normal parking candidate position 72 overlapping the registered parking candidate position 70. Accordingly, it is possible to further prevent a situation in which the registered parking candidate position 70 is difficult to be visually recognized.

When the normal parking candidate position 71 and the registered parking candidate position 70 are detected in the same external environment recognition data by the detection of the parking candidate positions based on the external environment recognition data and the detected normal parking candidate position 71 and the registered parking candidate position 70 do not overlap each other, the display control unit 56 displays both the normal parking candidate position 71 and the registered parking candidate position 70. Accordingly, when the visibility of the normal parking candidate position 71 and the registered parking candidate position 70 is not deteriorated, it is possible to select a parking candidate position according to an option and a situation of the user by displaying the respective parking candidate positions.

When the normal parking candidate position 71 and the registered parking candidate position 70 are detected in the same external environment recognition data by the detection of the parking candidate positions based on the external environment recognition data and the detected normal parking candidate position 71 and the registered parking candidate position 70 do not overlap each other, the display control unit 56 displays the normal parking candidate position 71 and the registered parking candidate position 70 in different modes. Accordingly, the user can easily distinguish between the normal parking candidate position 71 and the registered parking candidate position 70.

The parking candidate position detection unit 55 of the calculation unit 52 detects the normal parking candidate positions based on, for example, frame line recognition for recognizing a parking frame or space recognition for recognizing a vacant parking space. By detecting the normal parking candidate positions based on the information, it is possible to accurately detect a normal parking candidate position.

The parking candidate position detection unit 55 detects the registered parking candidate position by comparing the feature points of the external environment recognition data for the currently detected parking position with the feature points of the external environment recognition data for the designated parking position registered by the user in the past. By comparing the feature points of the external environment recognition data, it is possible to accurately determine whether a parking candidate position is the registered designated parking position.

The present disclosure is not limited to the above embodiment, and modifications, improvements, and the like can be made as appropriate.

For example, in the above embodiment, a case where the vehicle 10 is autonomously parked by autonomous steering of the parking control unit 58 has been described, but the present disclosure is not limited thereto. For example, the present disclosure may be applied to parking assistance in which guidance is performed when the vehicle 10 is parked by an operation of the driver.

In the above embodiment, a case where the display control unit 56 displays the top view image 60 or the like on the touch screen 42 of the vehicle 10 has been described, but the present disclosure is not limited thereto. For example, the display control unit 56 may display the top view image 60 or the like on a display screen of an information terminal (for example, a smartphone) carried by the occupant of the vehicle 10 via the communication unit 24.

In the above embodiment, a case where information such as the map including the feature points related to the designated parking position is registered in the storage unit 54 of the vehicle 10 has been described, but the present disclosure is not limited thereto. For example, the information may be registered in a storage unit of another device such as an information terminal or a server communicably connected to the vehicle 10.

In the above embodiment, an example in which the moving body is a vehicle (a four-wheeled automobile) has been described, but the present disclosure is not limited thereto. For example, the moving body may be a vehicle such as a two-wheeled vehicle or a Segway. Further, the concept of the present disclosure can be applied not only to a vehicle but also to a robot, a ship, an aircraft, or the like that is provided with a driving source and is movable by power of the driving source.

The control method described in the above embodiment can be implemented by executing a control program prepared in advance on a computer. The control program is recorded in a computer-readable storage medium and is executed by being read from the storage medium. In addition, the control program may be provided in a form of being stored in a non-transitory storage medium such as a flash memory or may be provided via a network such as the Internet. The computer that executes the control program may be provided in a control device, may be provided in an electronic device such as a smartphone, a tablet terminal, or a personal computer capable of communicating with the control device or may be provided in a server device capable of communicating with the control device and the electronic device.

At least the following matters are described in the present specification. Although the corresponding components or the like in the above embodiment are illustrated in parentheses, the present disclosure is not limited thereto.

(1) A control device including:

a parking candidate position detection unit (parking candidate position detection unit 55) configured to detect a first parking candidate position (normal parking candidate positions 71 and 72) based on external environment recognition data of a moving body (vehicle 10) and a second parking candidate position (registered parking candidate position 70) registered in advance by a user of the moving body;

a display control unit (display control unit 56) configured to cause a display device (touch screen 42) to display detected parking candidate positions;

a reception unit (reception unit 57) configured to receive, from a user of the moving body, selection of a target parking position from among the displayed parking candidate positions; and a parking control unit (parking control unit 58) configured to park the moving body at the selected target parking position, in which the display control unit causes to display the second parking candidate position preferentially over the first parking candidate position, when the first parking candidate position and the second parking candidate position are detected and the first parking candidate position and the second parking candidate position overlap each other.

According to (1), it is possible to prevent a situation in which the second parking candidate position is difficult to be visually recognized or selected due to the display of the first parking candidate position even though the second parking candidate position based on the past registration of the user is detected.

(2) The control device according to (1), in which when the first parking candidate position and the second parking candidate position are detected and the first parking candidate position and the second parking candidate position overlap each other, the display control unit causes to display the first parking candidate position in a more inconspicuous manner than the first parking candidate position when the first parking candidate position and the second parking candidate position do not overlap each other.

According to (2), it is possible to prevent a situation in which the second parking candidate position is difficult to be visually recognized due to the display of the first parking candidate position, and it is possible to autonomously park the moving body at the registered parking position accurately.

(3) The control device according to (2), in which when the first parking candidate position and the second parking candidate position are detected and the first parking candidate position and the second parking candidate position overlap each other, the display control unit hides the first parking candidate position overlapping the second parking candidate position.

According to (3), it is possible to further prevent a situation in which the second parking candidate position is difficult to be visually recognized.

(4) The control device according to (3), in which when the first parking candidate position and the second parking candidate position are detected and the first parking candidate position and the second parking candidate position do not overlap each other, the display control unit causes to display the first parking candidate position and the second parking candidate position.

According to (4), when the first parking candidate position and the second parking candidate position do not overlap each other and the visibility is not deteriorated, it is possible to select a parking candidate position according to an option and a situation of the user by displaying the first parking candidate position and the second parking candidate position, and the usability is improved.

(5) The control device according to (4), in which when the first parking candidate position and the second parking candidate position are detected and the first parking candidate position and the second parking candidate position do not overlap each other, the display control unit causes to display the first parking candidate position and the second parking candidate position in different modes.

According to (5), the user can easily distinguish between the first parking candidate position and the second parking candidate position.

(6) The control device according to any one of (1) to (5), in which the first parking candidate position is detected based on at least one of detection of a parking frame and detection of a vacant parking space.

According to (6), it is possible to accurately detect the first parking candidate position by performing detection based on the information.

(7) The control device according to any one of (1) to (6), in which the second parking candidate position is detected based on a comparison between feature points of external environment recognition data registered by the user in advance and feature points of current external environment recognition data.

According to (7), by comparing the feature points of the external environment recognition data, it is possible to accurately determine whether a parking candidate position is the registered designated parking position.

(8) A control method performed by a processor of a control device, comprising:

detecting a first parking candidate position based on external environment recognition data of a moving body and a second parking candidate position registered in advance by a user of the moving body;

displaying parking candidate positions detected by the detection on a display device;

receiving selection of a target parking position from among the displayed parking candidate positions from a user of the moving body; and parking the moving body at the selected target parking position, wherein the control method includes displaying the second parking candidate position preferentially over the first parking candidate position, when the first parking candidate position and the second parking candidate position are detected and the first parking candidate position and the second parking candidate position overlap each other in a case where the parking candidate positions are displayed on the display device.

According to (8), it is possible to prevent a situation in which the second parking candidate position is difficult to be visually recognized or selected due to the display of the first parking candidate position even though the second parking candidate position based on the past registration of the user is detected.

(9) A non-transitory computer-readable recording medium that stores a control program for causing a processor of a control device to execute a process, the process comprising:

detecting a first parking candidate position based on external environment recognition data of a moving body and a second parking candidate position registered in advance by a user of the moving body;

causing a display device to display detected parking candidate positions detected;

receiving, from a user of the moving body, selection of a target parking position from among the displayed parking candidate positions; and parking the moving body at the selected target parking position, wherein the process includes displaying the second parking candidate position preferentially over the first parking candidate position, when the first parking candidate position and the second parking candidate position are detected and the first parking candidate position and the second parking candidate position overlap each other in a case where the parking candidate positions are displayed on the display device.

According to (9), it is possible to prevent a situation in which the second parking candidate position is difficult to be visually recognized or selected due to the display of the first parking candidate position even though the second parking candidate position based on the past registration of the user is detected.

The invention claimed is:

1. A control device comprising circuitry configured to:

detect a first parking candidate position based on external environment recognition data of a moving body and a second parking candidate position registered in advance by a user of the moving body;

cause a display device to display detected parking candidate positions;

receive, from a user of the moving body, selection of a target parking position from among the displayed parking candidate positions; and park the moving body at the selected target parking position, wherein the circuitry causes to display the second parking candidate position preferentially over the first parking candidate position, when the first parking candidate position and the second parking candidate position are detected and the first parking candidate position and the second parking candidate position overlap each other.

2. The control device according to claim 1, wherein when the first parking candidate position and the second parking candidate position are detected and the first parking candidate position and the second parking candidate position overlap each other, the circuitry causes to display the first parking candidate position in a more inconspicuous manner than the first parking candidate position when the first parking candidate position and the second parking candidate position do not overlap each other.

3. The control device according to claim 2, wherein when the first parking candidate position and the second parking candidate position are detected and the first parking candidate position and the second parking candidate position overlap each other, the circuitry hides the first parking candidate position overlapping the second parking candidate position.

4. The control device according to claim 3, wherein when the first parking candidate position and the second parking candidate position are detected and the first parking candidate position and the second parking candidate position do not overlap each other, the circuitry causes to display the first parking candidate position and the second parking candidate position.

5. The control device according to claim 4, wherein when the first parking candidate position and the second parking candidate position are detected and the first parking candidate position and the second parking candidate position do not overlap each other, the circuitry causes to display the first parking candidate position and the second parking candidate position in different modes.

6. The control device according to claim 1, wherein the first parking candidate position is detected based on at least one of detection of a parking frame and detection of a vacant parking space.

7. The control device according to claim 1, wherein the second parking candidate position is detected based on a comparison between feature points of external environment recognition data registered by the user in advance and feature points of current external environment recognition data.

8. A control method performed by a processor of a control device, comprising:

detecting a first parking candidate position based on external environment recognition data of a moving body and a second parking candidate position registered in advance by a user of the moving body;

causing a display device to display detected parking candidate positions:

receiving, from a user of the moving body, selection of a target parking position from among the displayed parking candidate positions; and parking the moving body at the selected target parking position, wherein the control method comprises causing to display the second parking candidate position preferentially over the first parking candidate position, when the first parking candidate position and the second parking candidate position are detected and the first parking candidate position and the second parking candidate position overlap each other in a case where the parking candidate positions are displayed on the display device.

9. A non-transitory computer-readable recording medium that stores a control program for causing a processor of a control device to execute a process, the process comprising:

detecting a first parking candidate position based on external environment recognition data of a moving body and a second parking candidate position registered in advance by a user of the moving body;

causing a display device to display detected parking candidate positions;

receiving, from a user of the moving body, selection of a target parking position from among the displayed parking candidate positions; and parking the moving body at the selected target parking position, wherein the process comprises causing to display the second parking candidate position preferentially over the first parking candidate position when the first parking candidate position and the second parking candidate position are detected and the first parking candidate position and the second parking candidate position overlap each other in a case where the parking candidate positions are displayed on the display device.

* * * * *